J. L. McWHORTER.
INK BOTTLE.
APPLICATION FILED MAY 29, 1912.
1,090,555.
Patented Mar. 17, 1914.
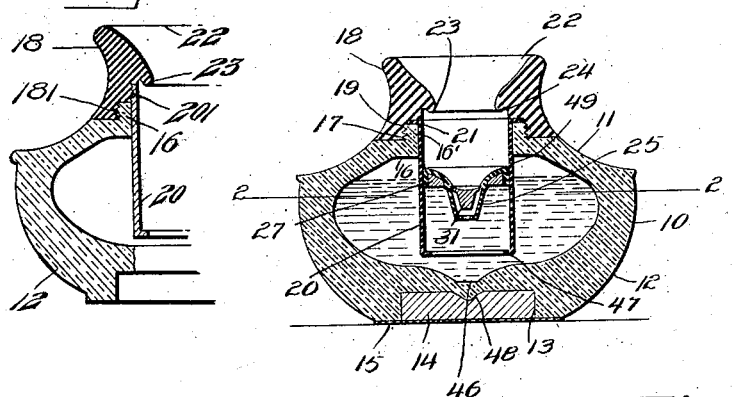
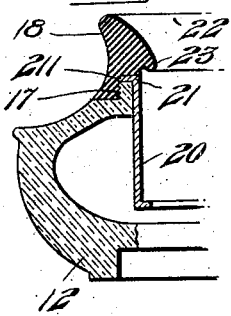
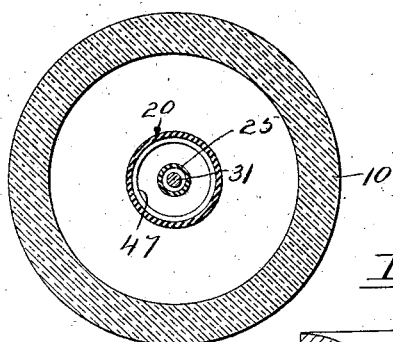
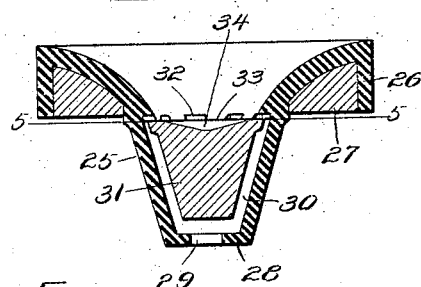
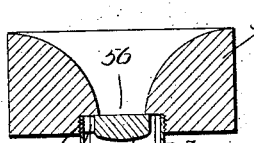
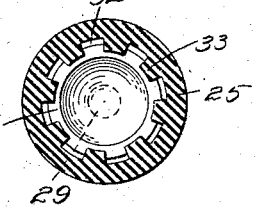
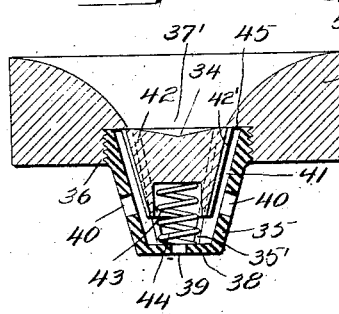
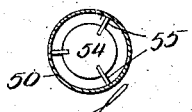
Witnesses
F. C. Gibson.
E. L. Greenewald.
Inventor
J. L. McWhorter
by
Foster Freeman Watson & Coit
Attorneys

UNITED STATES PATENT OFFICE.

JAMES L. McWHORTER, OF LA FAYETTE, GEORGIA.

INK-BOTTLE.

1,090,555.　　　Specification of Letters Patent.　Patented Mar. 17, 1914.

Application filed May 29, 1912. Serial No. 700,438.

*To all whom it may concern:*

Be it known that I, JAMES L. McWHORTER, a citizen of the United States, and resident of La Fayette, county of Walker, State of Georgia, have invented certain new and useful Improvements in Ink-Bottles, of which the following is a specification.

This invention relates to ink stands or bottles and more particularly to an automatically self-righting ink bottle.

One of the objects of the present invention is to improve the construction of ink bottles and to provide a simple and comparatively inexpensive ink bottle adapted when upset or knocked down to right itself instantly and provide the same with means for cutting off the flow of ink and for catching any small amount of ink tending to flow from the bottle.

A further object of the invention is to provide an ink bottle having means therein capable of protecting the point of the pen and of preventing the same from dipping up too much ink and of insuring a uniform supply of ink to the pen until practically the entire contents of the bottle is consumed.

Another object is to provide an improved float tube which will protect the ink in the bottle from exposure to the atmosphere thereby preventing evaporation of the ink.

Other objects and the novel features of the invention will be apparent from the following description, taken in connection with the drawing, in which, Figure 1 is a central vertical sectional view of an ink bottle embodying my invention; Fig. 2 is a horizontal sectional view on the line 2—2 of Fig. 1; Fig. 3 is an enlarged vertical sectional view of the floating ink feeding casing; Fig. 4 is an enlarged vertical sectional view of a modified form of the floating casing; Fig. 5 is a horizontal sectional view along line 5—5 of Fig. 3; Fig. 6 is a vertical sectional view of a modified form of floating casing. Fig. 7 is a sectional view along line 7—7 of Fig. 6. Figs. 8 and 9 are fragmentary views of modifications.

Referring to the drawing, 10 designates an ink bottle or ink stand designed to be constructed of glass or any other suitable material and consisting of a neck or upwardly tapering portion 11 and a lower downwardly projecting tapering portion 12 having a flat bottom and provided therein with a horizontal recess 13 for the reception of a weight 14.

The lower portion 12 of the bottle or receptacle 10 presents a smooth rounded exterior surface and coöperates with the weight 14 in causing the ink bottle to right itself instantly when upset or knocked down. The weight which is designed to be constructed of lead or any other suitable material may be secured in the recess 13 in any suitable manner, such as by screw threads or by being molded or cemented in the recess. The lower face of the weight is flush with the base of the ink bottle and the entire bottom of the bottle is covered by gluing or securing thereto in any suitable manner a thin pad 15 of soft rubber, felt or similar material to prevent noise and to afford frictional contact on sloping surfaces, thereby preventing sliding. The pad will also enable the ink bottle to be placed on and moved over polished surfaces without scratching or otherwise marring the same.

The tapered upper portion or neck 11 of the bottle has an inwardly extending horizontal annular top or flange 16 having an upwardly projecting portion 16′ providing an exterior recess 17 for the reception of a mouth piece 18 having a concavely curved outer face forming a continuation of and arranged flush with the slightly curved outer face of the neck portion 11. The mouth piece 18 which is preferably made of hard rubber or similar material is provided at the lower edge with an interior annular recess 19 having screw threads thereon to engage corresponding threads in the exterior recess 17 on the flange 16. The upper part of the bottle being thus of thinner material than the bottom and narrowed inwardly toward the neck, reduces the amount of wall in this part of the bottle. In addition to the reduction of weight afforded by thus necking in the upper part of the body of the bottle, the mouth piece constructed of lighter material, is of much less weight than glass and the like. These features assist in providing a bottle which will readily right itself. Furthermore the body portion of the bottle is so designed and proportioned with reference to the neck portion that in case the bottle is tipped over and rests for a moment on its side, or on its side and the edge of the mouth piece, and the ink therein flows toward the piece, and the upper end which in such an event would be the lowest point, the weight of the base and body portion will at all times overbalance the weight of the mouth piece, neck portion and the ink in that end of the bottle and seek to maintain the bottle in an upright position.

The mouth piece is readily detachable to afford access to the interior of the bottle and removably secures therein a stationary depending cylindrical casing 20 which fits snugly into the neck of the bottle at the top or flange 16 and is provided at its upper edge with an outwardly extending horizontal flange 21. The flange 21 is held between the flange 16 and the mouth piece 18 or the flange 21 may be omitted and the upper end of the casing 20 threaded as indicated at 201 in Fig. 8 to engage threads 181 on the mouth piece 18 of the bottle. As shown in Fig. 9, the flange 21 may be provided with exterior screw threads 211 of the same size and pitch as those of the bottle and the mouth piece to screw into the recess of the latter or it may be smooth at the outer edge and simply clamped on the bottle by the mouth piece as indicated in Fig. 1. The arrangements shown in Figs. 8 and 9 will therefore permit removal of the casing 20 with the mouth-piece 18 when the latter is screwed off of the bottle.

The upper portion of the mouth piece has an interior taper or flare 22 and is provided at the bottom thereof with a depending overhanging guard flange 23 adapted should the bottle upset to catch any small amount of ink which might tend to flow from the bottle. The inner face of the guard flange 23 is inclined and arranged at an angle to the vertical inner face of the lower portion of the mouth piece to form an annular groove or gutter 24 to catch any outflowing ink.

The depending tube or casing 20 which is also preferably constructed of hard rubber receives and forms a guide for a floating ink supply casing 25 of approximately inverted conical shape constructed of hard rubber or other suitable material. An enlarged vertical cross sectional view of the said casing 25 is shown in Fig. 3. The casing 25 is provided at the upper edge thereof with a depending annular flange 26 arranged vertically and adapted to snugly fit the interior of the depending tube or casing 20, being guided by the latter. Both the outer surface of the flange 26 and the inner surface of the depending tube 20 are very smooth to permit the conical casing 25 to slide easily up and down. The upper portion of the floating cone or casing 25 is flared and a cork ring 27 is arranged in the annular space or recess between the flange 26 and the flaring portion thereof to render the casing 25 buoyant so that the casing will float on the surface of the ink and fall as the ink is consumed. Any other suitable material may be employed for accomplishing this result, such as providing a hollow portion or chamber around the cone.

The lower end of the cone is truncated, however, the same may be cylindrical as shown in Fig. 6 and slightly rounded at the bottom to permit the same to go to the bottom of the sump in the bottom of the bottle. It will be seen that the inner surface of the bottle gradually slopes to the bottom toward the sump to allow all of the ink to flow into the sump. The lower end is provided with a horizontal bottom 28 having a central opening 29 therein to admit ink into the lower portion of the casing. The lower portion of the cone or casing forms a float or valve chamber 30 having at the top an inwardly extending flange adapted to form a stop to limit the upward movement of a depressible float or valve member 31. The flange at the upper end of the valve chamber is provided at intervals with recesses 32 which leave intervening projections 33 extending inwardly over and engaging the float.

The float which is preferably made of cork to protect or avoid injuring the point of a pen has its top dished or hollowed out as at 34 to form an ink cup and when a pen is inserted into the bottle the float is depressed and operates as a valve to close the bottom opening 29 and shuts off the flow of the ink into the float chamber 30. At the same time the recesses or openings 32 permit the ink in the float chamber 30 to flow over the float into the dished out upper face or ink cup 34 and a uniform depth of ink is exposed to the pen so that the latter will not dip up too much ink. The float which is tapered downward is cut away at the sides below the top flange leaving sufficient space between the cone and the float for the ink which presses the float upward against the flange at the top of the float chamber. The recessed upper face 34 of the float reduces the weight of the latter and enables the pen to dip into the ink the desired depth without danger of the pen taking up too much ink and blotting the paper. The depth to which the pen is allowed to go in the ink is regulated by the depth to which the lower part of the cone is allowed to go into the ink. The outer face of the flange 26 and the inner face of the tube or casing 20 have a smooth finish to enable the conical member 25 to move freely in the tube or casing 20 and at the same time will prevent the ink leaking over the top of the cone.

Fig. 4 is an enlarged sectional view of a modified form of the floating casing or cone. In this illustration the cone is made up of the lower hard rubber portion 35 provided at its upper end with screw threads 36 or other attaching means by which it is connected to an annular conical member 37 of cork or similar floating material adapted to slide within the tube 20. The member 37 may also constitute a hollow floating chamber. The lower hard rubber or non-corrodible portion 35 is truncated and has a lower horizontal portion 38 having a central opening 39 therein and the side walls are provided with the openings 40 therein. The openings in the walls of the member 35 communicate with a float chamber 41 on the interior. A float 42 similar in most respects to the float 31 operates as a valve within the chamber 41 and there is a recess 43 in its lower wall adapted to receive a spring 44 seated on the lower wall 38 of the hard rubber member 35. The floating casing 37 is shown as annular and has a central conical recess which reduces its weight and enables the pen to be more readily inserted into the ink in the same. The float portion 37 of the cone has an interior flange 45 against which the float 42 is pressed by the said spring 44. The flange 45 is sufficiently high up in the cone to permit the float or valve 42 to rise with its upper surface above the surface of the ink when at its highest level. By this arrangement also, the valve 42 closes the central opening 37' of the float portion 37 thus protecting the ink in the cone from exposure to the atmosphere. By providing grooves 42' in the side walls of the valve 42 or grooves 35' inside of the conical member 35 or grooves in both the cone and valve, the ink will rise above the valve when the latter is depressed by the pen.

In the modified form of floating casing shown in Figs. 6 and 7, the lower hard rubber portion 50 is of the same cross section throughout except at the lower end, here shown cylindrical in form. The said portion 50 is threaded at its upper end as at 51 to engage threads on the float or upper portion 52. The said portion 50 is slightly rounded at its bottom to permit it to go into the sump 46, and at its bottom has an opening 53 to admit ink. A cork valve 54 of less cross sectional area than the cylindrical member 50 operates in the latter, normally has its upper surface above the surface of the ink, closes the central upper opening 56 and is adapted to close the opening 53 when depressed. The bottom of the valve 54 is slightly rounded to correspond to the bottom of member 50. The valve 54 has vertical, radially projecting lugs 55 which engage the inner surface of casing 50 and constitute guiding means for the valve, and also provide means whereby the ink may pass by the valve as it is depressed and as it rises. The vertical lugs may, of course, be secured to the inner wall of casing member 50 and thus provide guiding means for the valve.

The lower portion of the floating casing in all instances is submerged in the ink and in order to enable practically all of the ink in the bottle to be consumed, the bottom of the bottle is provided with a central depression or sump 46 and the tube 20 extends downward sufficiently close to the bottom of the bottle to permit the lower end of the floating casing to lie in the depression of sump 46 when the said casing is at the limit of its downward movement and rests upon an inwardly extending flange 47 at the lower end of the tube 20. By this construction the floating casing or cone is submerged to a sufficient depth to cover the float when the ink runs low in the bottle. The weight 14 is provided in its upper face with a depression 48 coinciding with the depression 46 so as to enable the necessary thickness of the wall of the bottle to be maintained at the center of the bottom thereof. The lower flange 47 which is annular and extends inwardly from the lower end of the tube or casing 20, forms a stop for the cone and insures its removal with the tube or casing 20 when the latter is detached.

The oval shape of the bottle in vertical section presents a neat and attractive appearance and provides a receptacle of relatively large capacity not easily overturned. The thick bottom having the weight therein will strike first if the bottle should fall and being the strongest portion of the bottle will be less liable to break. The float also operates as a valve to prevent the ink from flowing out of the bottle should the latter upset. The float, the cone and the tube or casing protect the ink in the bottle from the air and prevent evaporation and only a small amount of ink in the cone will be exposed to the action of the air. One or more small vent perforations 49 may be provided in the tube or casing 20, if desired. If the ink bottle should be tipped over on a sloping surface or near the edge of the surface it would be much less liable to roll off than most ink bottles as it will immediately right itself instead of rolling on the surface.

It is believed that the operation of the device will be clear from the foregoing description.

Numerous variations in the construction of the bottle may be made without departing from the spirit of the invention and therefore I do not wish to be limited to the exact details as shown and described.

Having described the invention what is claimed is,

1. In an ink bottle, the combination with a receptacle, of a tube or casing extending into the receptacle, a floating member guided by the tube or casing and provided with a chamber communicating with the receptacle, and depressible means within the chamber and forming a closure for the same.

2. In an ink bottle, the combination with a receptacle, of a tube extending downward into the receptacle, a floating casing guided in the tube and provided with a chamber communicating with the receptacle, and depressible means operating within the chamber and forming a closure for the same and controlling the flow of ink into the chamber.

3. In an ink bottle, the combination with a receptacle, of a stationary tube extending downward into the same, a floating casing guided in the tube and having a chamber provided with an inlet opening, and a depressible member operating within the chamber and normally forming a closure for the top of the same and adapted when depressed to form a closure for the inlet opening.

4. In an ink bottle, the combination with a receptacle, of a tube extending downward into the same, a floating casing guided in the tube and having a chamber provided at the lower portion with an inlet opening and a float operating within the chamber and normally forming a closure at the top of the same and adapted to be depressed to form a closure for the inlet opening.

5. In an ink bottle, the combination with a receptacle, of a floating casing operating therein and having a chamber provided with an inlet and a depressible member operating within said chamber and normally forming a closure to prevent the ink from flowing from the chamber.

6. In an ink bottle of the class described, the combination with a receptacle, of a floating casing operating therein and having a chamber provided with an inlet near its lower end, and a depressible member confined within the said chamber and normally forming a closure to prevent the ink from flowing from the chamber and adapted to control the said inlet.

7. In an ink bottle, the combination with a receptacle, of a vertical tube extending into the same, a floating casing of substantial coniform guided in the tube and having a chamber provided with an inlet, and a tapered float operating within the chamber and normally forming a closure at the top of the chamber and adapted when depressed to close the inlet.

8. In an ink bottle, the combination with a receptacle, of a stationary vertical guiding tube, a floating cone operating within the tube and having a chamber provided at the bottom with an inlet, said cone being also provided at the top of the chamber with a stop, and a tapered float located within the chamber and normally held against the stop and depressible to close the inlet.

9. In an ink well, the combination with a receptacle having an opening at the top thereof comprising the inlet and outlet of the receptacle, of a tubular casing fitting said opening and extending into the receptacle, a floating device arranged in said casing and comprising a portion of buoyant material at the top and a part having a chamber extending below said buoyant portion, and a depressible float within the chamber for controlling the flow of ink into and out of the same.

10. In an ink bottle, the combination with a receptacle, of a vertical guiding member, a floating casing of inverted conical form guided in the member and having a chamber provided at the bottom with an opening and having a flange at the top, and a tapered float operating within the chamber and normally held against said flange and depressible to close the inlet.

11. In an ink bottle, the combination with a receptacle, of a vertical guiding tube, a floating casing of inverted conical form guided in the tube and having a chamber provided at the bottom with an opening and having a flange at the top, and a tapered float operating within the chamber and having a dished upper face.

12. In an ink bottle, the combination with a receptacle provided in its bottom with a depression, of a guide member depending from the top of the receptacle and terminating short of the bottom thereof, a floating casing operating along said guide member and adapted to extend into the depression, said casing having a chamber provided at the bottom with an inlet and a depressible closure member operating in the chamber.

13. In an ink bottle, the combination with a receptacle provided at its bottom with a depression, a tube depending from the top of the receptacle and terminating short of the bottom thereof, a floating casing operating within the tube and adapted when at the limit of its downward movement to extend into the depression, said casing having a chamber provided near the bottom with an inlet, and a depressible closure member operating in the chamber to control the flow of ink into and out of the same.

14. An ink bottle of the class described, comprising a receptacle having a mouth, a casing extending through said mouth into the receptacle and an interior guard flange at the mouth of the receptacle, extending inside the edge of the casing and arranged to catch the ink and to prevent the same from flowing outwardly.

15. In an ink bottle, the combination with a receptacle having a threaded neck, of a threaded mouth piece screwed to the neck and extending over the same, a vertical tube having a flange supported on the neck and clamped by the mouth piece, a floating casing operating within the tube, and a float controlling the flow of ink to the casing.

16. In an ink bottle, the combination with receptacle, of a floating casing operating therein and having a chamber provided with an inlet, a depressible float within the chamber and normally closing the same, and means for returning the float to its normal position when the same has been depressed.

17. In an ink bottle, the combination with a receptacle, of a floating casing operating therein and having a chamber provided with an inlet near its bottom and an outlet near the top, a depressible float in the chamber and normally closing the outlet and adapted when depressed to close the inlet, and means for guiding the floating casing in the receptacle.

18. In an ink bottle, the combination with a receptacle, of a floating casing operating therein comprising a member of buoyant material connected to a tubular member of non-corrodible material, said tubular member constituting a chamber having an outlet at the top and an inlet near the bottom, and a depressible float within the chamber normally closing the outlet.

19. In an ink bottle, the combination with a receptacle, of a guiding member extending into the receptacle, a floating casing guided thereby and having a chamber provided with an inlet and an outlet, a depressible float in the chamber normally closing the outlet and adapted when depressed to close the inlet, and resilient means for sustaining the float in its normal position.

20. In an ink bottle, the combination with a receptacle, of a tubular guiding member extending into the receptacle, a two piece conical floating casing guided thereby and having a chamber provided with an inlet near its lower end and an outlet at its upper end, a conical depressible float normally closing the outlet and adapted when depressed to close the inlet, and resilient means adapted to sustain the float in its normal position.

21. In an ink bottle, the combination with a receptacle having a threaded neck, of a threaded mouthpiece screwed to the neck, a vertical tube supported on the neck and maintained in position by said mouthpiece, a floating casing operating within the tube, a float controlling the flow of ink to the casing and a guard flange extending inwardly over the edge of the tube and arranged to catch the ink and prevent the same from flowing outwardly.

In testimony whereof I affix my signature in presence of two witnesses.

JAMES L. McWHORTER.

Witnesses:
B. F. THURMAN,
W. B. LOWE.